(12) United States Patent
Fritz et al.

(10) Patent No.: US 11,604,777 B1
(45) Date of Patent: Mar. 14, 2023

(54) INDEXING SERVICE FOR PETABYTE-SCALE DATASETS

(71) Applicant: Amazon Technologies, Inc., Seattle, WA (US)

(72) Inventors: Jonathan Fritz, Seattle, WA (US); Anthony A. Virtuoso, Hawthorne, NJ (US)

(73) Assignee: Amazon Technologies, Inc., Seattle, WA (US)

( * ) Notice: Subject to any disclaimer, the term of this patent is extended or adjusted under 35 U.S.C. 154(b) by 93 days.

(21) Appl. No.: 17/035,297

(22) Filed: Sep. 28, 2020

(51) Int. Cl.
*G06F 16/22* (2019.01)
*G06F 16/2455* (2019.01)
*G06N 20/00* (2019.01)

(52) U.S. Cl.
CPC ...... *G06F 16/2219* (2019.01); *G06F 16/2246* (2019.01); *G06F 16/2282* (2019.01); *G06F 16/2455* (2019.01); *G06N 20/00* (2019.01)

(58) Field of Classification Search
CPC ........ G06F 16/86; G06F 16/22; G06F 16/245; G06F 16/81; G06F 16/901
USPC ......................................................... 707/741
See application file for complete search history.

(56) References Cited

U.S. PATENT DOCUMENTS

| | | | |
|---|---|---|---|
| 9,600,524 B2* | 3/2017 | He | G06F 16/9535 |
| 10,467,304 B1* | 11/2019 | Lin | G06F 16/9535 |
| 10,936,559 B1* | 3/2021 | Jones | G06F 16/24562 |
| 2017/0039281 A1* | 2/2017 | Venkata | G06F 16/248 |
| 2018/0210907 A1* | 7/2018 | Hamada | G06F 16/2237 |
| 2020/0117658 A1* | 4/2020 | Venkata | G06F 16/248 |
| 2021/0224275 A1* | 7/2021 | Maheshwari | G06N 3/08 |

* cited by examiner

*Primary Examiner* — Hung T Vy
(74) *Attorney, Agent, or Firm* — Nicholson De Vos Webster & Elliott LLP (57) ABSTRACT

Techniques for indexing large scale datasets are described. A method for indexing large scale datasets can include receiving, by an indexing service, a request to generate an index for a dataset stored in an data storage service, the request including indexing information for the dataset, determining, by the indexing service, an index type based at least on the dataset, generating, by the indexing service, the index based at least on the indexing information and the index type, and receiving, by the indexing service, a request from a query service to identify a subset of the dataset using the index.

20 Claims, 9 Drawing Sheets

INDEXING SERVICE FOR PETABYTE-SCALE DATASETS

In many industries like automotive, robotics, advertising technology, agriculture, financial services, and logistics, customers are producing and storing vast amounts of data at a growing rate. Often times, customers choose to store this data in storage services which provide low-cost, durable, and scalable storage, creating what is known as a "data lake." Customers process and query this data at-scale using a variety of distributed query engines. To optimize data for performance, customers can use prefixes (e.g., the first set of characters for each object key), to speed up access on a single dimension of that dataset. For example, a customer collecting sensor data might use a temporal prefix like "[year]-[month]-[day]" to improve query performance for filtering by time. However, most customer datasets have multiple important dimensions, such as time, spatial location, and other arbitrary fields. For workloads that require efficiently accessing the data dimensions not reflected in a prefix, customers can experience poor performance because a workload may require full table partition scans on those dimensions.

BRIEF DESCRIPTION OF DRAWINGS

Various embodiments in accordance with the present disclosure will be described with reference to the drawings, in which.

DETAILED DESCRIPTION

The present disclosure relates to methods, apparatus, systems, and non-transitory computer-readable storage media for an indexing service for petabyte-scale datasets According to some embodiments, indexes can be automatically created, updated, tuned, and scaled indexes for large-scale (e.g., petabyte-scale) datasets stored in a storage service in a provider network. Embodiments remove the complexity of designing indexes to improve performance by using machine learning techniques to analyze customer query patterns and data types to determine a structure for the index that results in less data being accessed when processing queries. This enables customers to easily perform more queries at interactive speeds, reduce the time of crucial workloads, and reduce cost by using fewer compute cycles and scanning less data. In various embodiments, indexes may be generated that rely on different data structures depending on data types and access patterns, such as R-trees and quadtrees for spatial data, B-trees for generalized search, and Z-order indexing for generalized dimensionality reduction. As data changes in the underlying storage service, the index is automatically updated. In some embodiments, custom metadata can be added for some or all entries in an index, such as offsets within indexed files or mappings to spatial grids.

Storage services enable customers to store and access large amounts of data through a provider network. This allows customers to maintain large amounts of data without also having to manage the underlying hardware required to support the data. However, searching for data stored in a storage service can be time consuming and costly. For example, an object data store may include various unstructured data. Though some data storage services allow for data to be searched along a particular attribute, such as a prefix of an object key, if the attribute of interest is not included in this prefix, then a query on the dataset may require accessing or scanning every file to determine which files have the relevant data for that query. As a result, customers wait longer for their queries to complete and incur a higher cost, especially when using services that charge by the amount of data scanned per query. Some customers try to create secondary indexes for these datasets, but it is time consuming and requires specialized knowledge to choose the best configuration. Furthermore, once the index is designed, it is difficult to populate, manage, and keep up to date. Embodiments address these shortcomings by automatically generating appropriate indexes for customer data based on how the customer accesses their data as well as by keeping the indexes up to date as the data changes. As such, the customer does not need to have specialized knowledge to create and tune appropriate indexes and, once the indexes are created, experience more efficient query processing over their dataset.

Figure 1:
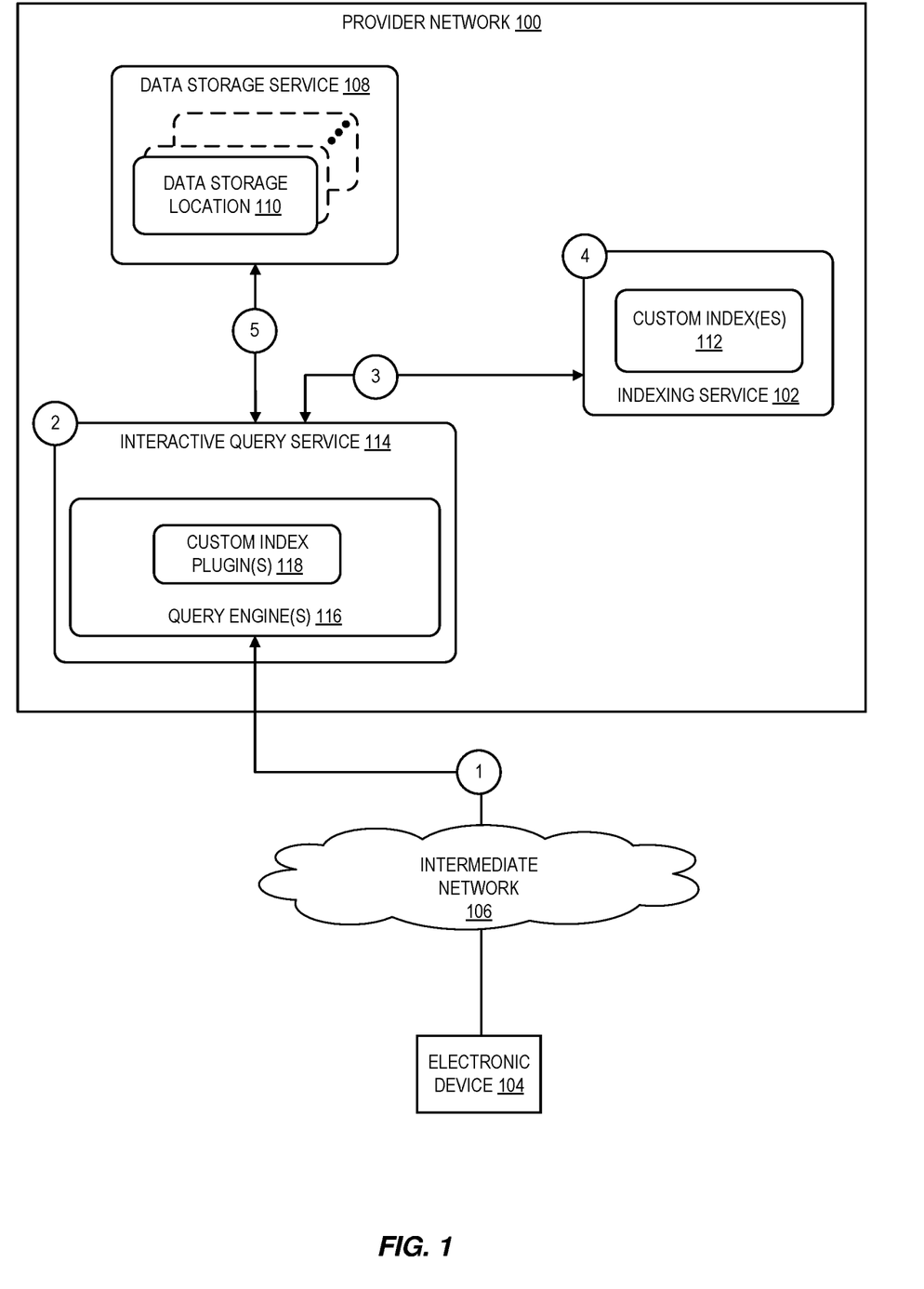
FIG. 1 is a diagram illustrating an environment for an indexing service according to some embodiments.

FIG. 1 is a diagram illustrating an environment for an indexing service according to some embodiments. A provider network 100 can provide users with the ability to utilize various services, such as an indexing service 102, a data storage service 108, and an interactive query service 114. The data storage service 108 may include an object storage service in which a customer can store unstructured data. Interactive query service 114 enables users to query their data stored in data storage service 108 using various types of queries. However, querying unstructured data can be costly and inefficient depending on the query patterns being used. For example, some object storage services enable customer data to be clustered on a single dimension. While queries on this dimension can be efficiently processed, queries on any other dimension require reading all of the customers items to identify relevant data items. For example, if a user has a dataset representing items clustered on a reference number, and the user wishes to identify which of those items have a color attribute equal to blue, all items in the dataset must be read to identify the relevant items.

Embodiments address this shortcoming by providing an indexing service 102. Indexing service 102 creates and manages these custom indexes 112 for a customer's data stored in a data storage service 108. In some embodiments, the data storage service 108 can store data in a plurality of data storage locations 110. The data storage locations 110 can include a folder or "bucket", a virtualized volume, a database, etc. The custom index(es) 112 created and maintained by the indexing service 102 can include different types of distributed and scalable indexes. As discussed further below, the custom indexes may include R-trees and quadtrees for spatial or spatial-temporal data, B-trees for generalized search, and Z-order indexing for generalized dimensionality reduction, etc.

A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) may be part of, or serve as a front-end to, a control plane of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as an availability domain, or simply a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Customers can connect to AZ of the cloud provider network via a publicly accessible network (e.g., the Internet, a cellular communication network), e.g., by way of a transit center (TC). TCs are the primary backbone locations linking customers to the cloud provider network and may be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence (or "POPs") outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 100 often rely upon virtualization techniques. For example, virtualization technologies may be used to provide users the ability to control or utilize compute resources (e.g., a "compute instance" such as a VM using a guest operating system (O/S) that operates using a hypervisor that may or may not further operate on top of an underlying host O/S, a container that may or may not operate in a VM, a compute instance that can execute on "bare metal" hardware without an underlying hypervisor), where one or multiple compute resources can be implemented using a single electronic device. Thus, a user may directly utilize a compute resource (e.g., provided by a hardware virtualization service) hosted by the provider network to perform a variety of computing tasks. Additionally, or alternatively, a user may indirectly utilize a compute resource by submitting code to be executed by the provider network (e.g., via an on-demand code execution service), which in turn utilizes one or more compute resources to execute the code—typically without the user having any control of or knowledge of the underlying compute instance(s) involved.

As shown in FIG. 1, at numeral 1, a customer can send a request from electronic device 104 to interactive query service 114 via one or more intermediate networks 106. In various embodiments, the interactive query service provides interfaces that enable users to configure the interactive query service to access and query any number of heterogeneous data sources storing data pertinent to the user. The interactive query service can receive and execute queries that involve data stored at any combination of a user's data sources. The queries may be expressed using a standard query language such as the Structured Query Language (SQL) or other query language. In some embodiments, a query engine may be implemented as any system capable of performing data retrieval based on one or more criteria (e.g., such as performing a GET operation based on one or more filtering parameters). In some embodiments, the interactive query service 114 is implemented using a distributed system running on a cluster of servers. For example, a cluster can include a coordinator instance that manages the operation of any number worker instances. At a high level, a query received from a client computing device is initially received by the control plane and forwarded to a coordinator instance. In some embodiments, the coordinator instance 120 then parses the query, analyzes and plans the execution of the query, and distributes the work to carry out a query execution plan to one or more worker instances using one or more query engines 116.

As discussed, executing such queries over the unstructured data in an object storage service or other data storage service can lead to significant data scanning to identify those items (e.g., files or other data) that are stored in the data storage service that are relevant to the query. As such, in some embodiments, at numeral 2, the query engine 116 can analyze the received query and determine, using a custom index plugin 118, whether there is a custom index 112 associated with the dataset being queried. In some embodiments, the custom index plugin 118 can be a library that maps an identifier in the received query to the custom index and/or to the indexing service. In some embodiments, the custom index plugin 118 may be an interface, such as an application programming interface (API), software development kit (SDK), or other interface associated with the indexing service which enables the query engine to determine whether the dataset being queried is associated with one or more custom indexes. In some embodiments, the custom index plugin 118 can be implemented as part of a query optimizer of query engine 116 which may heuristically identify an index maintained by indexing service 102 to use in processing a query.

If the dataset is associated with a custom index 112, then at numeral 3 the query can be forwarded to indexing service 102. Because the data and compute are separated, the indexing service 102 can create multiple different indexes for the customers dataset. As discussed, these may include R-trees and quadtrees for spatial or spatial-temporal data, B-trees for generalized search, and Z-order indexing for generalized dimensionality reduction, etc. At numeral 4, the custom index 112 can be used to identify data relevant to the query. For example, if the query is used to filter the dataset for a particular attribute, and a custom index 112 exists for that attribute, then the custom index can be used to determine pointers to the items in the dataset associated with the attribute. The identified pointers can be returned to the interactive query service which, at numeral 5, can use the pointers to access the associated data items from one or more data storage locations 110 of the data storage service 108. The query engine 116 can execute the query on the associated data items. This results in reading less data as the full dataset does not have to be scanned to identify the relevant data items, leading to cheaper and more efficiently executed query processing.

Figure 2:
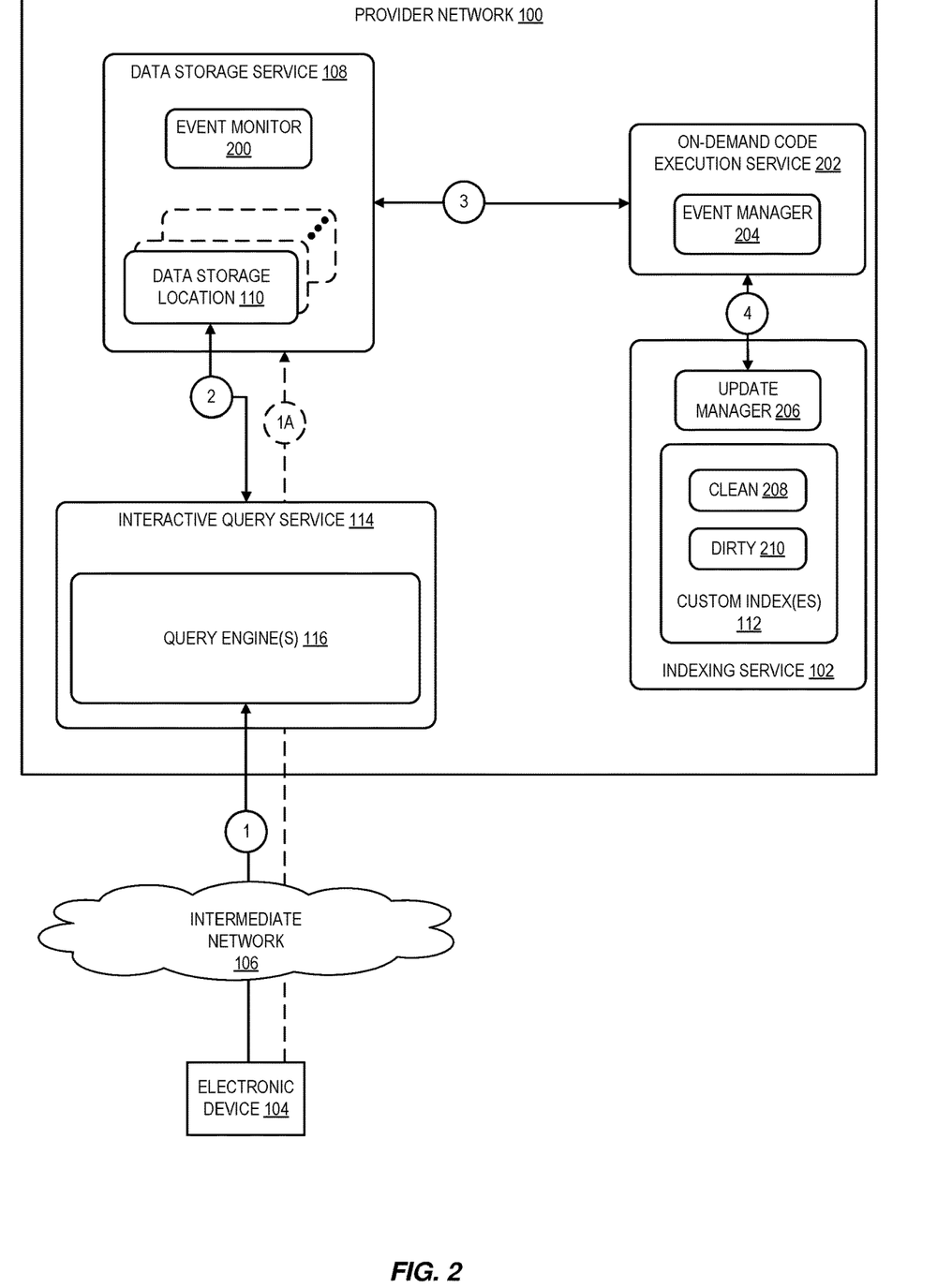
FIG. 2 is a diagram illustrating an environment for keeping indexes maintained by an indexing service up to date according to some embodiments.

FIG. 2 is a diagram illustrating an environment for keeping indexes maintained by an indexing service up to date according to some embodiments. As discussed, one or more custom indexes can be maintained for a customer's dataset stored in data storage service 108. The customer's dataset is typically not static, meaning that data in the dataset is being added to, removed, or changed over time. As a result, the indexing service 102 needs to keep the custom index 112 up to date as changes are made. As shown in FIG. 2, at numeral 1, a customer can send a request to make a change to their dataset. In this example, the change may be made via interactive query service 114. At numeral 2, the interactive query service 114 can execute the request to add, remove, or change data stored in one or more data storage locations 110 owned by the customer. Additionally, or alternatively, the customer may make changes to their dataset directly, as shown at numeral 1A, by adding, removing, or changing data stored in one or more data storage locations. For example, an data storage location 110 may be accessible through an endpoint, such as a uniform resource locator (URL) address, which the customer can access through a web browser or other front-end application, or other interface.

As shown in FIG. 2, the data storage service 108 may include an event monitor 200. When particular operations, such as those operations associated with adding, deleting, or changing data in the data storage service, are executed, the operations can generate an event which is received by the event monitor 200. These events may identify the type of operation being performed, the data on which the operation was performed, the data storage location where the data is/was stored, etc. At numeral 3, the event monitor can forward the event to an event manager 204 which may be implemented by an on-demand code execution service 202. In some embodiments, the event monitor 200 can output an event stream as changes (e.g., writes, deletes, updates, etc.) occur to data stored in data storage locations 110. The event manager 204 can subscribe to the event stream such that notification of the changes is received in real-time or near real-time.

The on-demand code execution service 202 (referred to in various embodiments as a function compute service, functions service, cloud functions service, functions as a service, or serverless computing service) can enable code to be executed on cloud resources without having to select or manage the underlying hardware resources used to execute the code. For example, in various embodiments, a "serverless" function may include code provided by a user or other entity—such as the provider network itself—that can be executed on demand Serverless functions may be maintained within provider network 100 by an on-demand code execution service and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute resource, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

The event manager 204 can receive the event stream from the event monitor 200 and, at numeral 4, instruct an update manager 206 of the indexing service to index the changed data. In some embodiments, while the indexing service is updating the index, the custom index 112 can include a clean portion 208 and a dirty portion 210. The clean portion can correspond to the customer data that has not changed, and the dirty portion 210 can correspond to the customer data that has changed. If new data that has not yet been indexed has been added, then the clean portion is the existing custom index and the dirty portion refers to the unindexed data. In some embodiments, queries received during re-indexing can return pointers to data from the clean portion 208 of the custom index and pointers to the entire dirty portion 210 of the custom index. Additionally, or alternatively, the indexing service can indicate in its response that the results are incomplete due to the re-indexing operation being performed. In some embodiments, the response from the indexing service 102 may be delayed until the changes to the data have been indexed and a complete response can be returned. Once the changes have been indexed, the custom index once again can be used to query all or portions of the customer data for which the index has been created.

Figure 3:
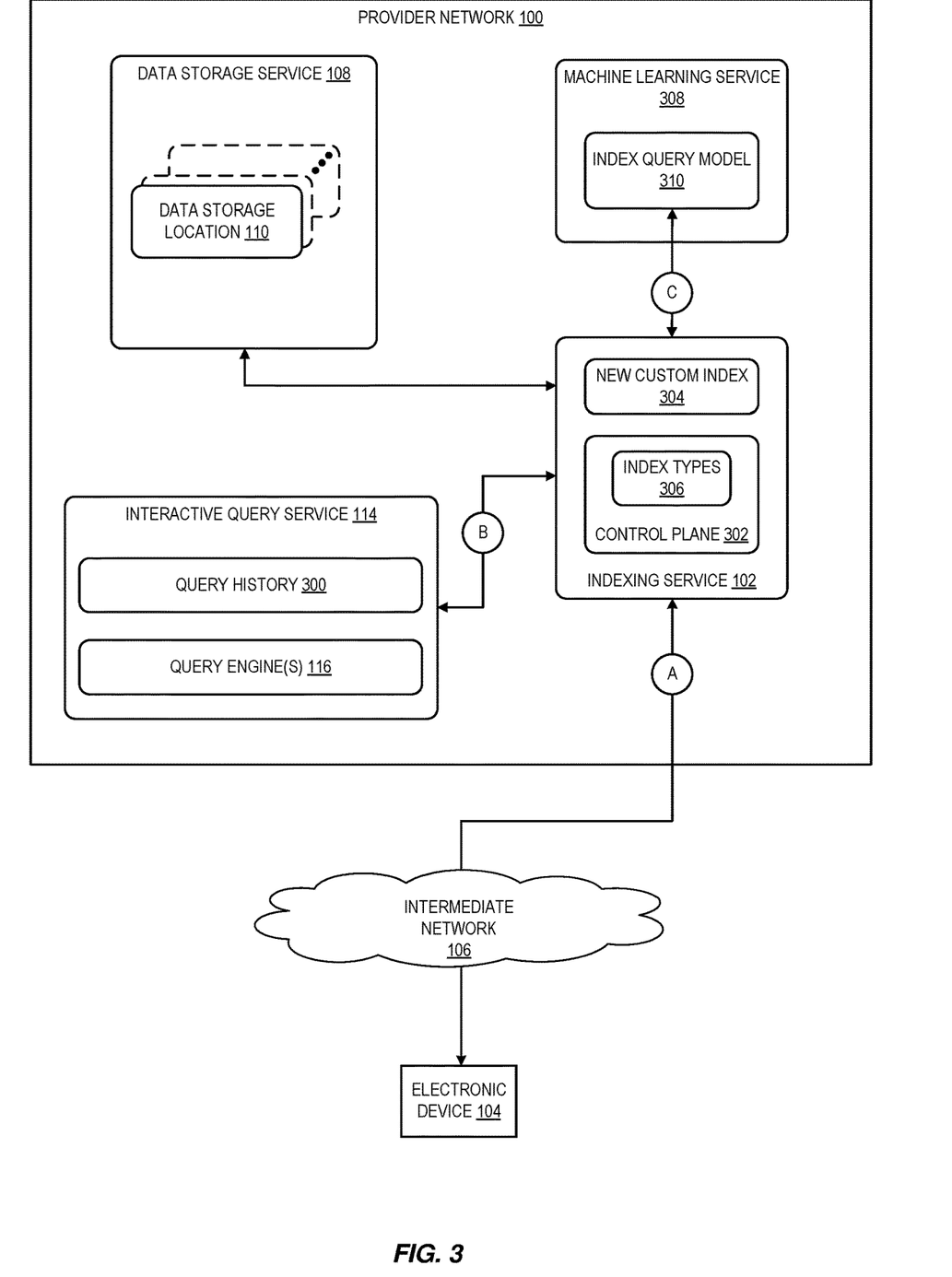
FIG. 3 is a diagram illustrating an environment for generating indexes by an indexing service according to some embodiments.

FIG. 3 is a diagram illustrating an environment for generating indexes by an indexing service according to some embodiments. In various embodiments, indexing service 102 can generate a custom index 112 for a customer's data automatically, based on the observed query patterns and retrieved data in a customer's query history 300 or on request from the customer or other user or service. For example, at A, a request can be sent to indexing service 102 from electronic device 104 by the customer to create an index. The request can identify the one or more data storage locations 110 associated with the customer's data and the attribute or attributes on which the customer wants the index to be constructed. In some embodiments, the request at A may additionally, or alternatively, specify the type of index to be constructed. A control plane 302 of the indexing service 102 can receive the request and generate a new custom index 304 of a supported index type 306 in response to the request. In some embodiments, the indexing service can return an identifier associated with the new custom index which the customer can include with future queries to be used by the query engine 116 to identify the appropriate index to use to process the queries.

In some embodiments, the interactive query service 114 can maintain a query history 300 for a customer. This may include details about the types of queries that the customer typically runs, the amount of data processed to execute those queries, and the results of those queries. At B, the indexing service can obtain the customer's query history. This may be performed periodically to determine whether a new custom index should be generated or whether an existing custom index should be tuned to better process the customer's queries. In some embodiments, the customer can request that the indexing service 102 review their query history and provide an index recommendation. Additionally, or alternatively, the customer may opt-in to periodic query history review and index generation. Based on the query history, the indexing service can determine what index types, and what attributes, may be used to generate a custom index 304 that will allow the queries to be processed more efficiently. For example, if a customer is scanning a large amount of data and receiving a small number of records in return, an index may be used to reduce the amount of data that needs to be scanned.

In some embodiments, an index type and/or attributes on which to index the data, may be recommended by a machine learning service 308. For example, at C, the indexing service can provide the query history, or data based on the query history, to machine learning service 308. Machine learning service 308 can include an index query model 310. Index query model 310 can include one or more machine learning algorithms trained to an index type based on the access patterns and result set from the query history 300. In some embodiments, the request can include metafeatures of the dataset (e.g., size, number of columns, number of rows, number of categorical columns, number of numerical columns, how long is the average text field in a column, etc.) and/or data types (e.g., spatial data, spatial-temporal data, etc.) and the machine learning model can recommend an index type based on the query history, metafeatures, and/or data types. In some embodiments, the index query model 310 can recommend a plurality of types of indexes to use for a given query history 300 and indexing service 102 can select one or more of the plurality of recommended index types to be generated. In some embodiments, the index query model can receive the query history and features of a current custom index and recommend ways of tuning the index to improve query performance.

Figure 4:
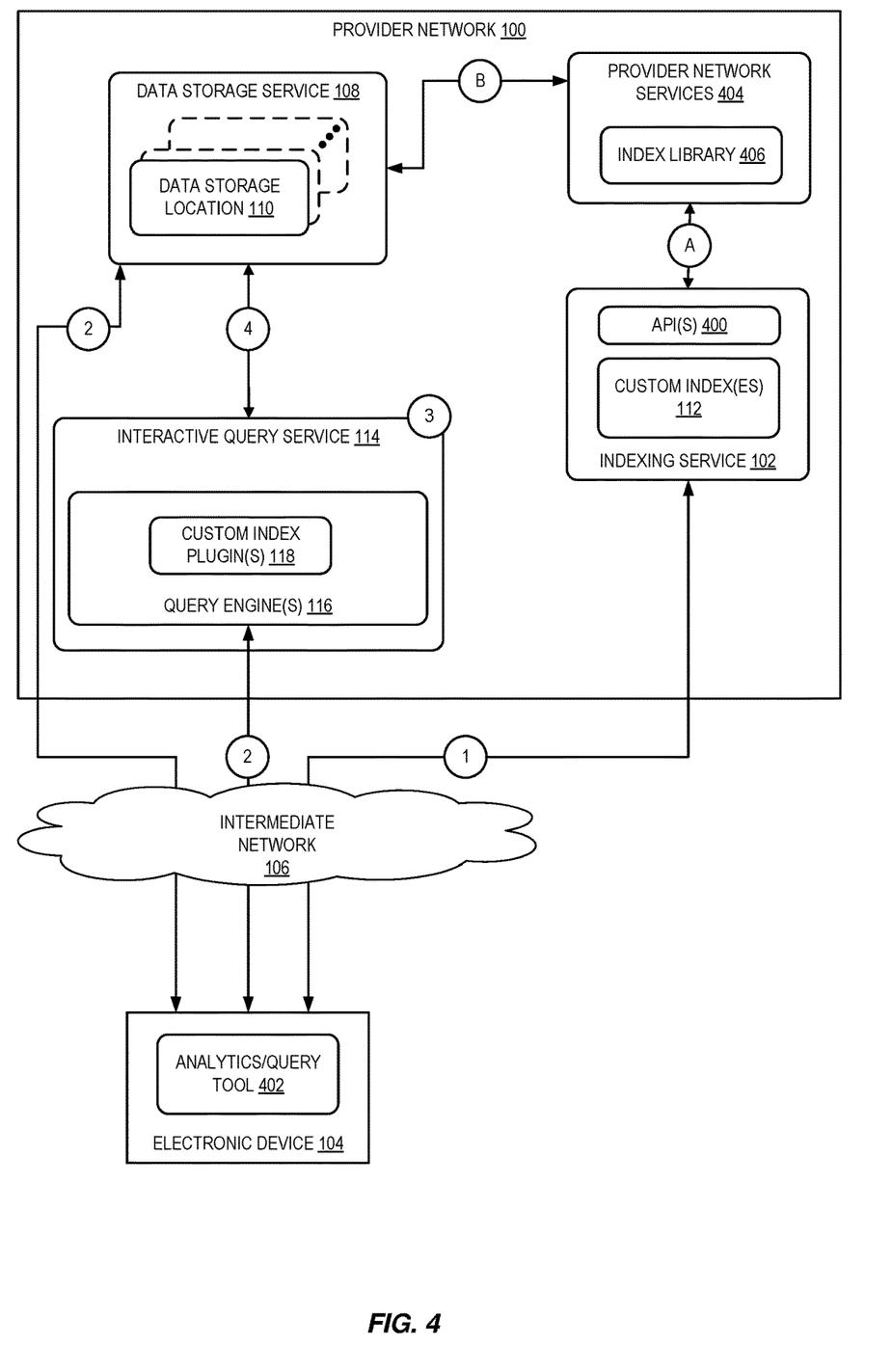
FIG. 4 is a diagram illustrating an environment for an indexing service according to some embodiments.

FIG. 4 is a diagram illustrating an environment for an indexing service according to some embodiments. In some embodiments, indexing service 102 can include an interface, such as API(s) 400, through which another service or customer can access the indexing service 102. For example, at numeral 1, a customer's analytics/query tool 402 executing on a customer electronic device 104 can send a request for one or more data items to be identified using the custom index 112. The request can include a query to be performed using the index which was generated by the analytics/query tool 402. The indexing service can return pointers to one or more data items based on execution of the query. At numeral 2, the electronic device 104 can then either scan the data items associated with the pointers directly or send a request to the interactive query service 114 to scan the data items associated with the pointers. For example, the analytics/query tool 402 can generate a query for those data items using the pointers and send it to the interactive query service 114 to be executed at numeral 3. At numeral 4, the data items can be scanned from the customers dataset stored in one or more data storage locations 110.

Similarly, in some embodiments, other services 404 provided by provider network 100 may interface directly with the indexing service via API 400, as shown at A. For example, the API can include a command that receives one or more identifiers associated with one or more data storage locations and a filter and returns one or more data items from the one or more data storage locations that satisfy the filter. In some embodiments, the filter may be a query or other criteria that can be used to identify the one or more data items using the custom index. At B, the data items can be scanned from the customers dataset stored in one or more data storage locations 110 by the service 404.

Figure 5:
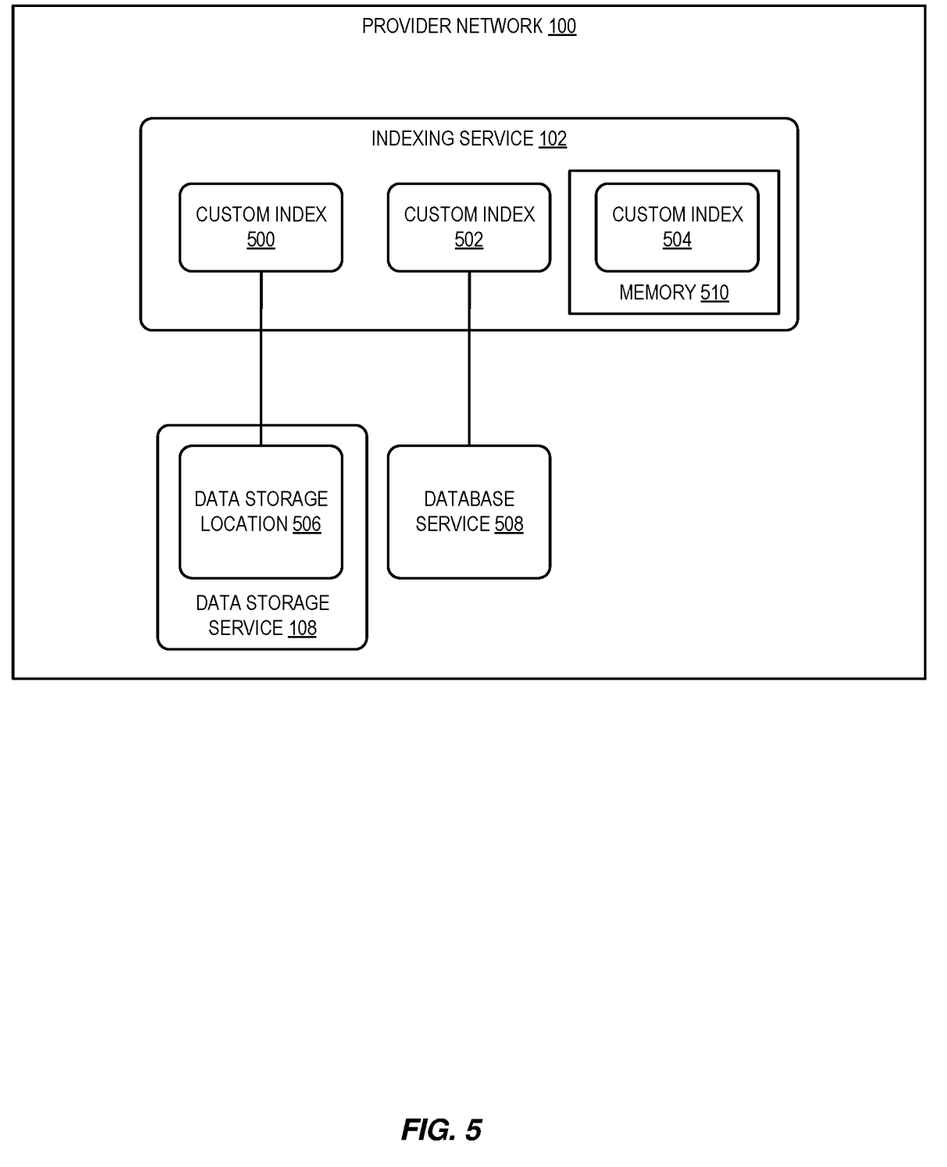
FIG. 5 is a diagram illustrating example indexes maintained by an indexing service according to some embodiments.

FIG. 5 is a diagram illustrating example indexes maintained by an indexing service according to some embodiments. As discussed, the indexing service 102 may maintain a plurality of custom indexes 500, 502, 504 for a customer's dataset. Depending on the type of index, each custom index may be backed by different data structures. For example, some customers may store data in the data storage service in a columnar storage file format, such as Parquet or ORC (optimized row-columnar). These storage formats allow customers to read only the column or columns of interest, without reading an entire file. Additionally, these formats can include headers at regular intervals that include metadata about the data stored in the next interval (e.g., the min/max values of the upcoming X rows of data). In some embodiments, the metadata stored in these regular fields can be extracted and consolidated into a single storage location 506 in data storage service 108. As a result, rather than performing potentially hundreds of thousands of seeks in a very large dataset to separately identify these fields spread throughout the dataset, the data storage location 506 can be searched for the relevant data responsive to a query. Additionally, or alternatively, other types of indexes, such as custom index 502, may be backed by one or more database tables in database service 508, while others may be maintained in memory 510.

Figure 6:
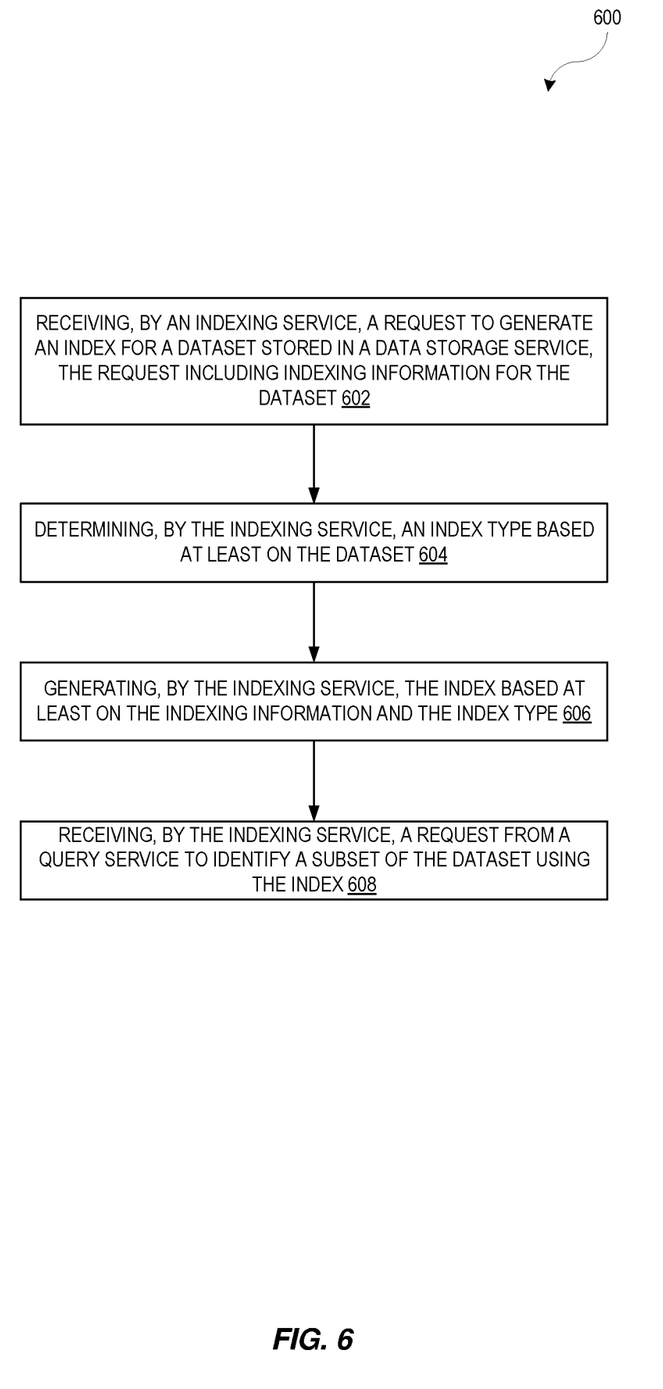
FIG. 6 is a flow diagram illustrating operations of a method for indexing large scale datasets according to some embodiments.

FIG. 6 is a flow diagram illustrating operations of a method for indexing large scale datasets according to some embodiments. Some or all of the operations 600 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 600 are performed by indexing service 102, interactive query service 114, data storage service 108, on-demand code execution service 202, machine learning service 308, etc. of the other figures.

The operations 600 include, at block 602, receiving, by an indexing service, a request to generate an index for a dataset stored in an data storage service, the request including indexing information for the dataset. In some embodiments, the request is received from a user associated with the dataset and wherein the indexing information includes at least one attribute on which to index the dataset. In some embodiments, receiving a request can include receiving the request from the query service, wherein the indexing information includes an access pattern associated with the dataset.

The operations 600 further include, at block 604, determining, by the indexing service, an index type based at least on the dataset. In some embodiments, the index type includes an R-tree, a quadtree, a B-tree, a consolidated index, or a z-order index. In some embodiments, determining the index type can include determining the index type based on a data type associated with the dataset and the access pattern. In some embodiments, determining the index type can include sending a request to a machine learning service to identify the index type, wherein the request includes at least one of the access pattern, metafeatures of the dataset, or a data type associated with the dataset.

The operations 600 further include, at block 606, generating, by the indexing service, the index based at least on the indexing information and the index type. In some embodiments, the indexing service can update the index as changes are made to the dataset. For example, in some embodiments, the operations can include receiving an event stream from the data storage service, the event stream identifying changes made to the dataset, and updating at least a portion of the index based on the event stream. In some embodiments, the generated index is stored in memory, in an data storage location in the data storage service, or in one or more database tables in a database service.

The operations 600 further include, at block 608, receiving, by the indexing service, a request from a query service to identify a subset of the dataset using the index. In some embodiments, in response to the query, the operations can include identifying pointers to data items in the subset of the dataset using the index and returning a response to the query service including the pointers to the data items in the subset of the dataset, wherein the query service processes the query using the data items retrieved using the pointers.

In some embodiments, the operations include receiving, by an interactive query service, a first query for a dataset stored in an object storage service, sending, by the interactive query service, a request to an indexing service to generate an index for the dataset, the request including at least an access pattern associated with the dataset determined from a query history associated with the dataset, wherein the indexing service determines an index type based at least on the access pattern and the dataset and generates the index, receiving, by the interactive query service, a second query for the dataset, the second query including a reference to the index, sending, by the interactive query service, a request to the indexing service for a subset of data from the dataset associated with the second query, receiving, by the interactive query service from the indexing service, pointers to the data from the dataset determined using the index, and returning a response to the second query using the subset of data from the dataset.

In some embodiments, the index types include one or more of an R-tree, a quadtree, a B-tree, a consolidated index, or a z-order index. In some embodiments the consolidated index includes index data consolidated from a plurality of entries spread throughout the dataset, and wherein the consolidated index is stored in a separate data storage location in a data storage service.

Figure 7:
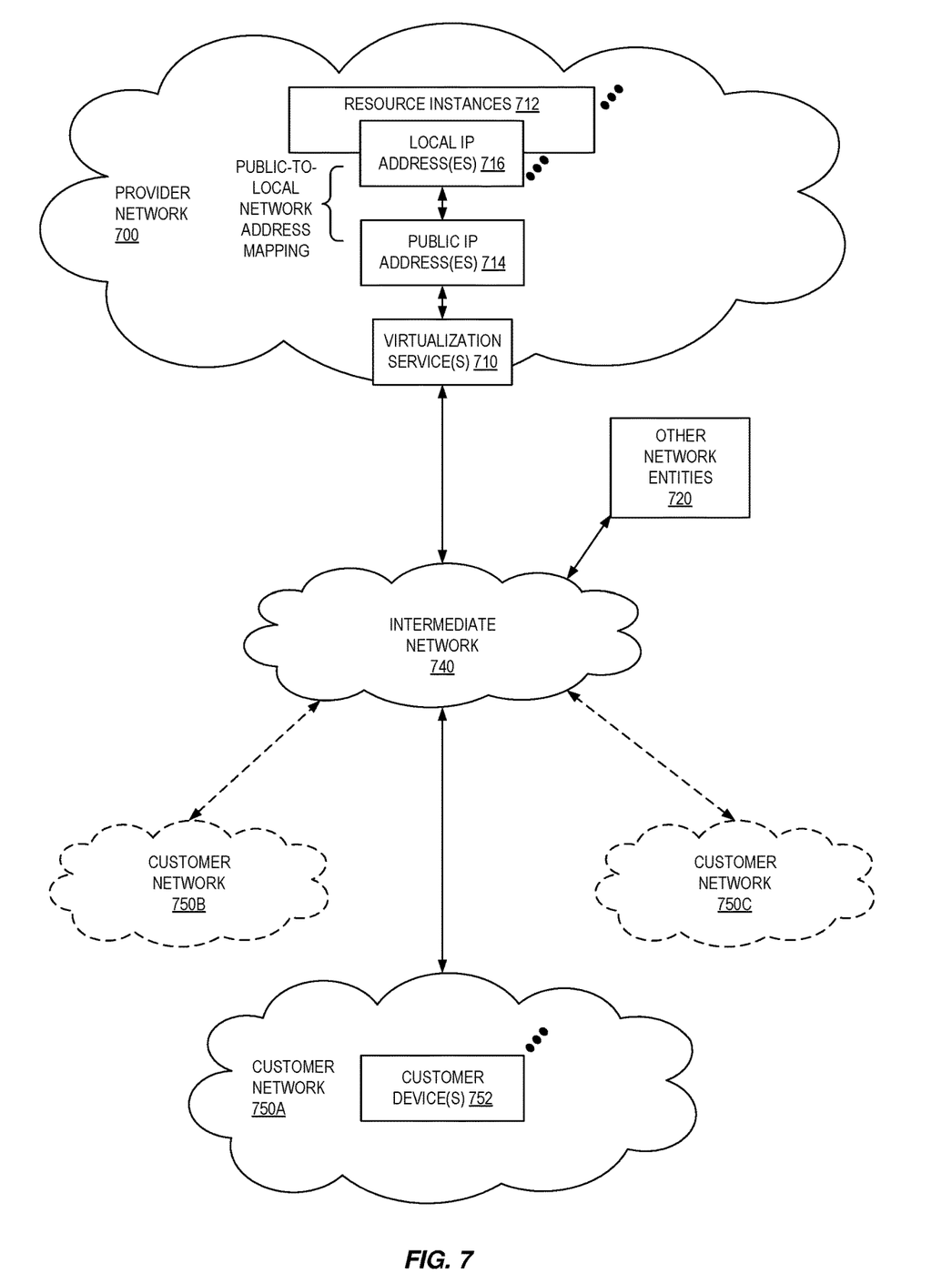
FIG. 7 illustrates an example provider network environment according to some embodiments.

FIG. 7 illustrates an example provider network (or "service provider system") environment according to some embodiments. A provider network 700 may provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 may be associated with the resource instances 712; the local IP addresses are the internal network addresses of the resource instances 712 on the provider network 700. In some embodiments, the provider network 700 may also provide public IP addresses 714 and/or public IP address ranges (e.g., Internet Protocol version 4 (IPv4) or Internet Protocol version 6 (IPv6) addresses) that customers may obtain from the provider 700.

Conventionally, the provider network 700, via the virtualization services 710, may allow a customer of the service provider (e.g., a customer that operates one or more client networks 750A-750C including one or more customer device(s) 752) to dynamically associate at least some public IP addresses 714 assigned or allocated to the customer with particular resource instances 712 assigned to the customer. The provider network 700 may also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of customer network(s) 750A-750C may, for example, implement customer-specific applications and present the customer's applications on an intermediate network 740, such as the Internet. Other network entities 720 on the intermediate network 740 may then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 may be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 700; a customer may then assign their allocated public IP addresses to particular resource instances allocated to the customer. These public IP addresses may be referred to as customer public IP addresses, or simply customer IP addresses. Instead of being assigned by the provider network 700 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
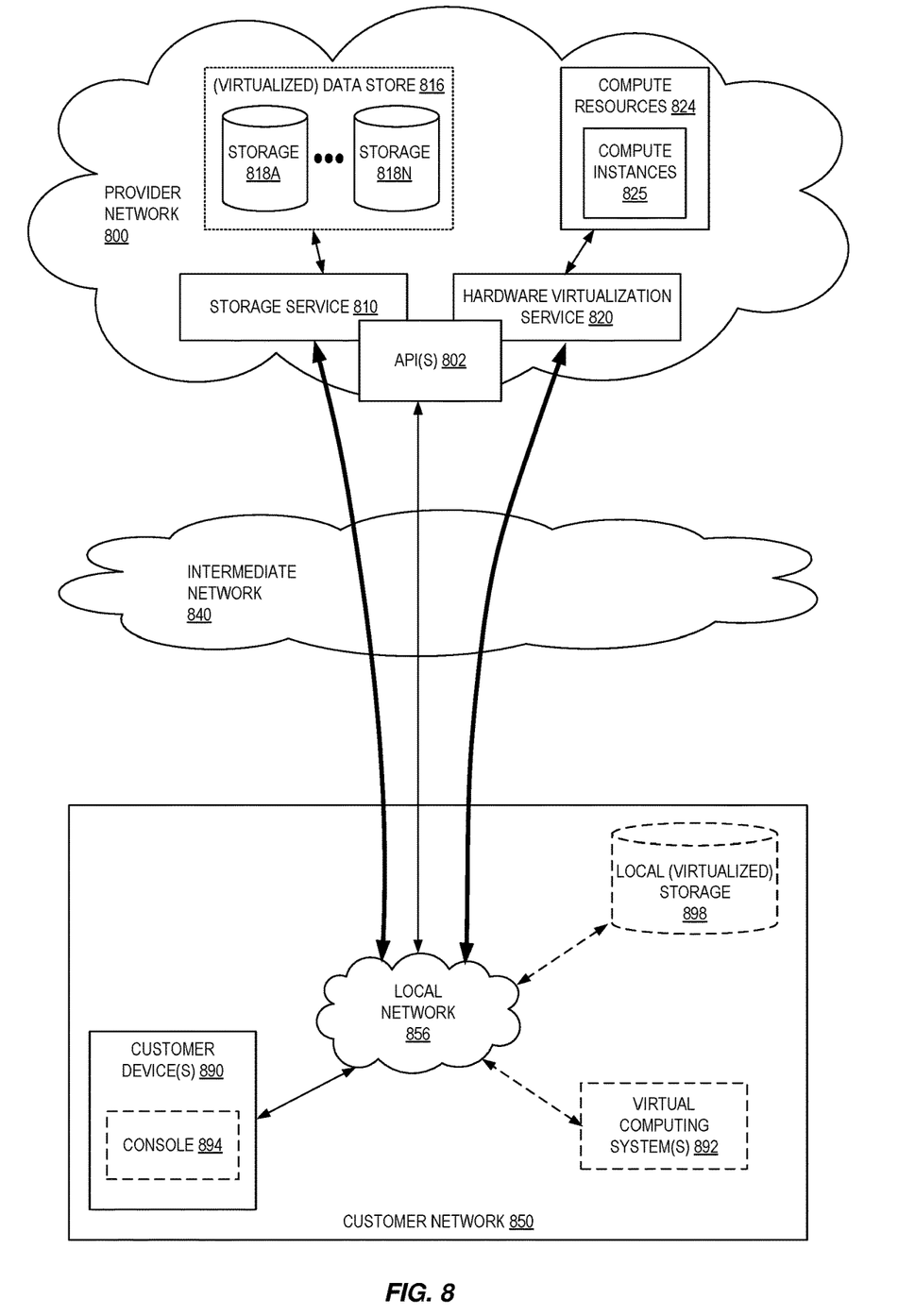
FIG. 8 is a block diagram of an example provider network that provides a storage service and a hardware virtualization service to customers according to some embodiments.

FIG. 8 is a block diagram of an example provider network that provides a storage service and a hardware virtualization service to customers, according to some embodiments. Hardware virtualization service 820 provides multiple compute resources 824 (e.g., compute instances 825 such as VMs) to customers. The compute resources 824 may, for example, be rented or leased to customers of the provider network 800 (e.g., to a customer that implements customer network 850). Each computation resource 824 may be provided with one or more local IP addresses. Provider network 800 may be configured to route packets from the local IP addresses of the compute resources 824 to public Internet destinations, and from public Internet sources to the local IP addresses of compute resources 824.

Provider network 800 may provide a customer network 850, for example coupled to intermediate network 840 via local network 856, the ability to implement virtual computing systems 892 via hardware virtualization service 820 coupled to intermediate network 840 and to provider network 800. In some embodiments, hardware virtualization service 820 may provide one or more APIs 802, for example a web services interface, via which a customer network 850 may access functionality provided by the hardware virtualization service 820, for example via a console 894 (e.g., a web-based application, standalone application, mobile application, etc.). In some embodiments, at the provider network 800, each virtual computing system 892 at customer network 850 may correspond to a computation resource 824 that is leased, rented, or otherwise provided to customer network 850.

From an instance of a virtual computing system 892 and/or another customer device 890 (e.g., via console 894), the customer may access the functionality of storage service 810, for example via one or more APIs 802, to access data from and store data to storage resources 818A-818N of a virtual data store 816 (e.g., a folder or "bucket", a virtualized volume, a database, etc.) provided by the provider network 800. In some embodiments, a virtualized data store gateway (not shown) may be provided at the customer network 850 that may locally cache at least some data, for example frequently-accessed or critical data, and that may communicate with storage service 810 via one or more communications channels to upload new or modified data from a local cache so that the primary store of data (virtualized data store 816) is maintained. In some embodiments, a user, via a virtual computing system 892 and/or on another customer device 890, may mount and access virtual data store 816 volumes via storage service 810 acting as a storage virtualization service, and these volumes may appear to the user as local (virtualized) storage 898.

While not shown in FIG. 8, the virtualization service(s) may also be accessed from resource instances within the provider network 800 via API(s) 802. For example, a customer, appliance service provider, or other entity may access a virtualization service from within a respective virtual network on the provider network 800 via an API 802 to request allocation of one or more resource instances within the virtual network or within another virtual network.

Illustrative Systems

Figure 9:
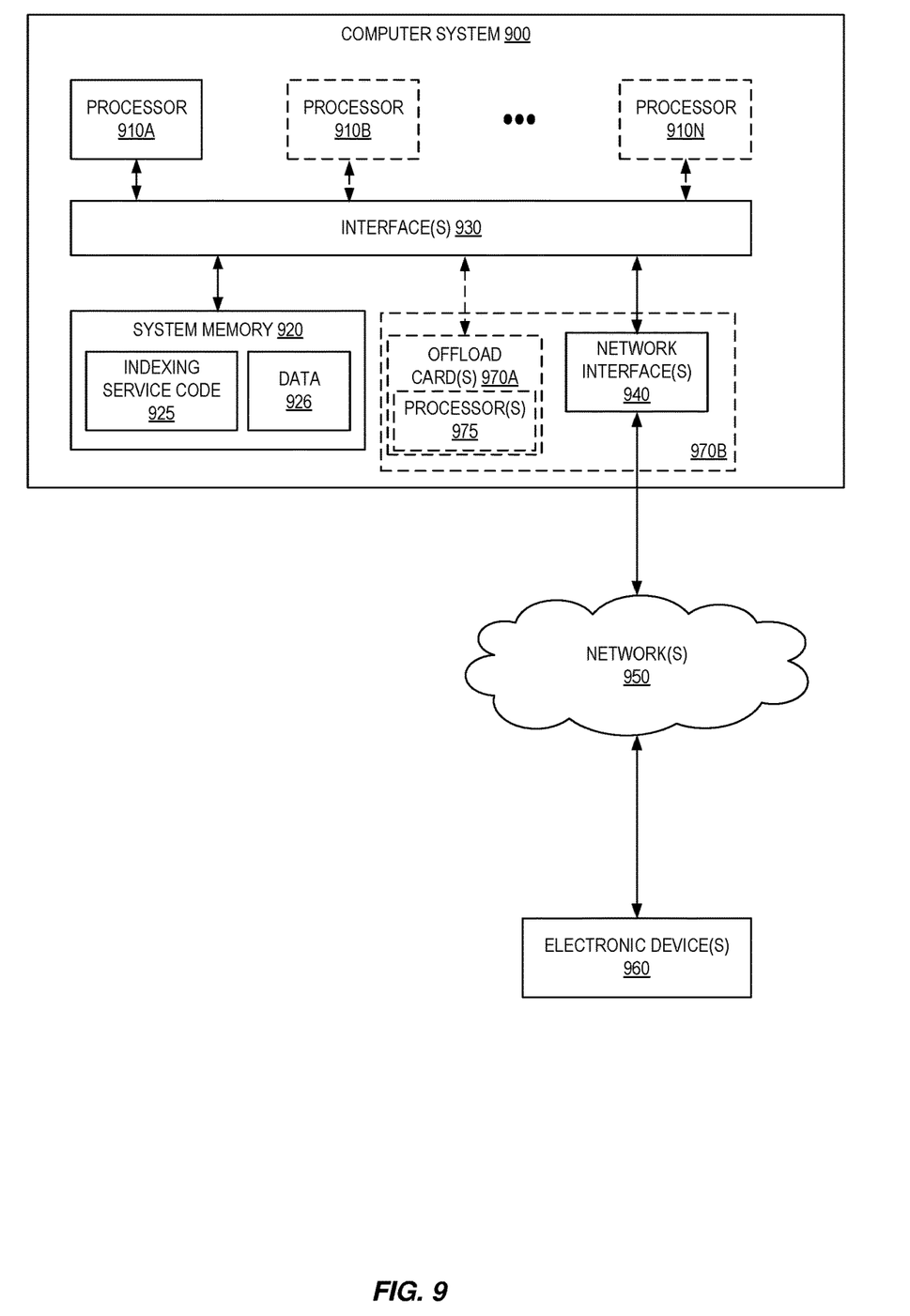
FIG. 9 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various embodiments a computer system 900 may include one computing device or any number of computing devices configured to work together as a single computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 910 may commonly, but not necessarily, implement the same ISA.

System memory 920 may store instructions and data accessible by processor(s) 910. In various embodiments, system memory 920 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 920 as indexing service code 925 (e.g., executable to implement, in whole or in part, the indexing service 102) and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIG. 1, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 900 includes one or more offload cards 970A or 970B (including one or more processors 975, and possibly including the one or more network interfaces 940) that are connected using an I/O interface 930 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 900 may act as a host electronic device (e.g., operating as part of a hardware virtualization service) that hosts compute resources such as compute instances, and the one or more offload cards 970A or 970B execute a virtualization manager that can manage compute instances that execute on the host electronic device. As an example, in some embodiments the offload card(s) 970A or 970B can perform compute instance management operations such as pausing and/or un-pausing compute instances, launching and/or terminating compute instances, performing memory transfer/copying operations, etc. These management operations may, in some embodiments, be performed by the offload card(s) 970A or 970B in coordination with a hypervisor (e.g., upon a request from a hypervisor) that is executed by the other processors 910A-910N of the computer system 900. However, in some embodiments the virtualization manager implemented by the offload card(s) 970A or 970B can accommodate requests from other entities (e.g., from compute instances themselves), and may not coordinate with (or service) any separate hypervisor.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 818A-818N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
    receiving, by an interactive query service, a first query for a dataset stored in an object storage service;
    sending, by the interactive query service, a first request to an indexing service to generate an index for the dataset, the first request including at least an access pattern associated with the dataset determined from a query history associated with the dataset;
    wherein the indexing service determines an index type based at least on the access pattern and the dataset and generates the index by:
        sending a second request to a machine learning service to determine the index type, the second request including at least one of an access pattern associated with the dataset, metafeatures of the dataset, or a data type associated with the dataset; and
        receiving, from the machine learning service, a recommendation of the index type based on the at least one of an access pattern associated with the dataset, metafeatures of the dataset, or a data type associated with the dataset;
    receiving, by the interactive query service, a second query for the dataset, the second query including a reference to the index;
    sending, by the interactive query service, a third request to the indexing service for a subset of data from the dataset associated with the second query;
    receiving, by the interactive query service from the indexing service, pointers to the data from the dataset determined using the index; and
    returning a response to the second query using the subset of data from the dataset.

2. The computer-implemented method of claim 1, wherein the index types include one or more of an R-tree, a quadtree, a B-tree, a consolidated index, or a z-order index.

3. The computer-implemented method of claim 2, wherein the consolidated index includes index data consolidated from a plurality of entries spread throughout the dataset, and wherein the consolidated index is stored in a separate object storage location in a data storage service.

4. A computer-implemented method comprising:
    receiving, by an indexing service, a first request to generate an index for a dataset stored in a data storage service, the first request including indexing information for the dataset;
    determining, by the indexing service, an index type based at least on the dataset by:
        sending a second request to a machine learning service to determine the index type, the second request including at least one of an access pattern associated with the dataset, metafeatures of the dataset, or a data type associated with the dataset; and
        receiving, from the machine learning service, a recommendation of the index type based on the at least one of an access pattern associated with the dataset, metafeatures of the dataset, or a data type associated with the dataset;
    generating, by the indexing service, the index based at least on the indexing information and the index type; and
    receiving, by the indexing service, a third request from a query service to identify a subset of the dataset using the index.

5. The computer-implemented method of claim 4, wherein the first request is received from a user associated with the dataset and wherein the indexing information includes at least one attribute on which to index the dataset.

6. The computer-implemented method of claim 4, wherein receiving, by an indexing service, a first request to generate an index for a dataset stored in a data storage service, the first request including indexing information for the dataset, further comprises receiving the first request from the query service, wherein the indexing information includes an access pattern associated with the dataset.

7. The computer-implemented method of claim 6, wherein the index type includes an R-tree, a quadtree, a B-tree, a consolidated index, or a z-order index.

8. The computer-implemented method of claim 7, wherein determining, by the indexing service, an index type based at least on the dataset, further comprises determining the index type based on a data type associated with the dataset and the access pattern.

9. The computer-implemented method of claim 7, wherein the consolidated index includes index data consolidated from a plurality of entries spread throughout the dataset, and wherein the consolidated index is stored in a separate object storage location in a data storage service.

10. The computer-implemented method of claim 4, further comprising:
    receiving an event stream from the data storage service, the event stream identifying changes made to the dataset; and
    updating at least a portion of the index based on the event stream.

11. The computer-implemented method of claim 4, further comprising:
- identifying pointers to data items in the subset of the dataset using the index; and
- returning a response to the query service including the pointers to the data items in the subset of the dataset, wherein the query service processes the query using the data items retrieved using the pointers.

12. The computer-implemented method of claim 4, wherein the index is stored in memory, in an data storage location in the data storage service, or in one or more database tables in a database service.

13. A system comprising:
- a first one or more electronic devices to implement a query service in a multi-tenant provider network; and
- a second one or more electronic devices to implement an indexing service in the multi-tenant provider network, the indexing service including instructions that upon execution cause the indexing service to:
  - receive a first request to generate an index for a dataset stored in a data storage service, the first request including indexing information for the dataset;
  - determine an index type based at least on the dataset by:
    - sending a second request to a machine learning service to determine the index type, the second request including at least one of an access pattern associated with the dataset, metafeatures of the dataset, or a data type associated with the dataset; and
    - receiving, from the machine learning service, a recommendation of the index type based on the at least one of an access pattern associated with the dataset, metafeatures of the dataset, or a data type associated with the dataset;
  - generate the index based at least on the indexing information and the index type; and
  - receive a third request from the query service to identify a subset of the dataset using the index.

14. The system of claim 13, wherein the first request is received from a user associated with the dataset and wherein the indexing information includes at least one attribute on which to index the dataset.

15. The system of claim 13, wherein to receive a first request to generate an index for a dataset stored in a data storage service, the first request including indexing information for the dataset, the instructions, when executed, further cause the indexing service to receive the first request from the query service, wherein the indexing information includes an access pattern associated with the dataset.

16. The system of claim 15, wherein the index type includes an R-tree, a quadtree, a B-tree, a consolidated index, or a z-order index.

17. The system of claim 16, wherein to determine an index type based at least on the dataset, further comprises determine the index type based on a data type associated with the dataset and the access pattern.

18. The system of claim 16, wherein the consolidated index includes index data consolidated from a plurality of entries spread throughout the dataset, and wherein the consolidated index is stored in a separate object storage location in a data storage service.

19. The system of claim 13, wherein the instructions, when executed, further cause the indexing service to:
- receive an event stream from the data storage service, the event stream identifying changes made to the dataset; and
- update at least a portion of the index based on the event stream.

20. The system of claim 13, wherein the instructions, when executed, further cause the indexing service to:
- identify pointers to data items in the subset of the dataset using the index; and
- return a response to the query service including the pointers to the data items in the subset of the dataset, wherein the query service processes the query using the data items retrieved using the pointers.

* * * * *